United States Patent [19]

Chappell

[11] 4,427,932
[45] Jan. 24, 1984

[54] DIGITALLY CONTROLLED DRAFTING MACHINE

[76] Inventor: Bennie Chappell, 1260 Madera, Menlo Park, Calif. 94025

[21] Appl. No.: 360,218

[22] Filed: Mar. 22, 1982

[51] Int. Cl.³ .............................................. H02P 7/06
[52] U.S. Cl. .................................. 318/574; 318/603; 318/565; 340/686
[58] Field of Search ................ 340/686; 318/575, 603, 318/565, 490, 574

[56] References Cited

U.S. PATENT DOCUMENTS

| | | | |
|---|---|---|---|
| 3,609,315 | 9/1971 | Rogers | 318/603 |
| 3,619,755 | 11/1971 | Munro et al. | 318/603 X |
| 4,150,328 | 4/1979 | Cannon | 318/603 X |
| 4,204,144 | 5/1980 | Hill | 318/603 X |
| 4,255,643 | 3/1981 | Balfanz | 318/575 X |

OTHER PUBLICATIONS

"X-Y Rotational Positioning System"—Cochran et al., IBM Disclosure–, vol. 14, No. 2–Jul. 1971, pp. 644–645.

Primary Examiner—J. V. Truhe
Assistant Examiner—Richard M. Moose
Attorney, Agent, or Firm—Julian Caplan

[57] ABSTRACT

A drafting machine which employs two variable speed and one constant speed motors. A pencil is moved along both X- and Y-axes by means responsive to the speed differentials of the motors. Speeds of the motors are controlled by an electrical circuit having a plurality of off-on switches and a plurality of rocking switches. The latter load counters from a pulse generator into counters for straight line, circle, spiral and logarithmic spiral controls which control activation of resistors which govern the speeds of the two variable speed motors. Indicators indicate to the operator the direction in which the pencil is moving, the diameter of a circle being drawn, the increment (or decrement) of a spiral being drawn as compared with a circle and the increment (or decrement) of a logarithmic spiral being drawn as compared with a spiral.

15 Claims, 15 Drawing Figures

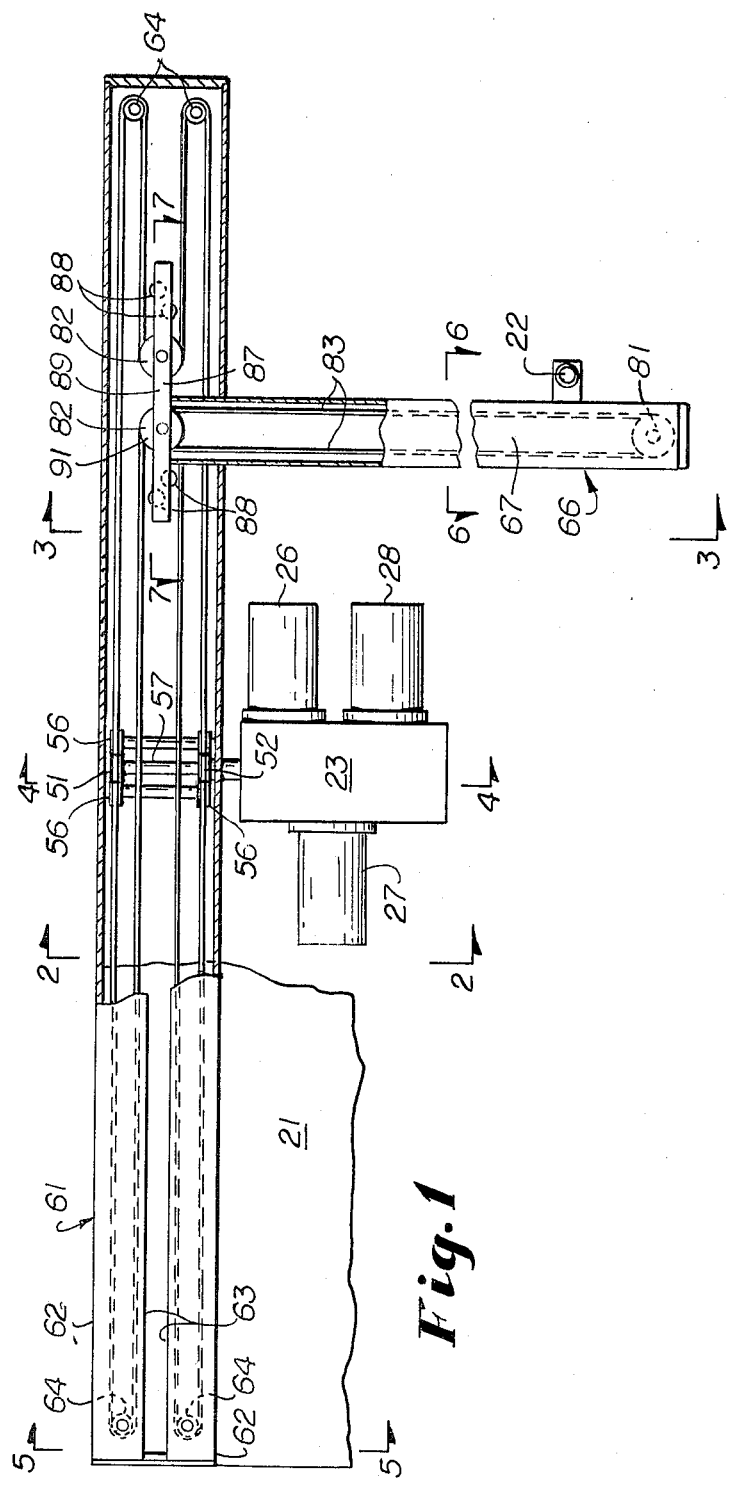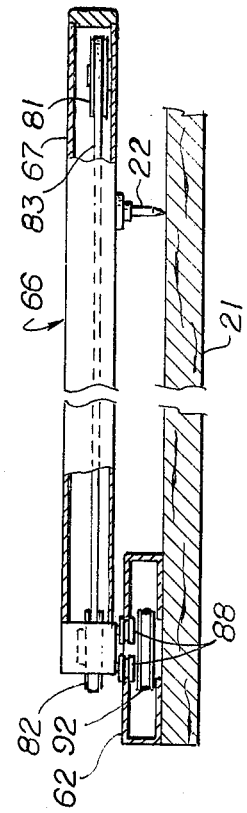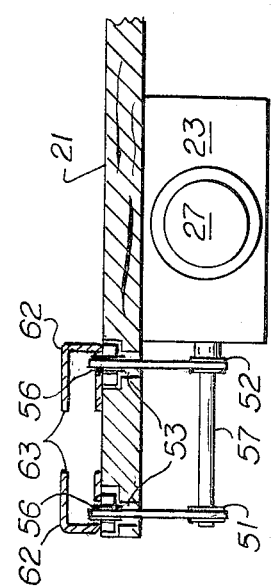

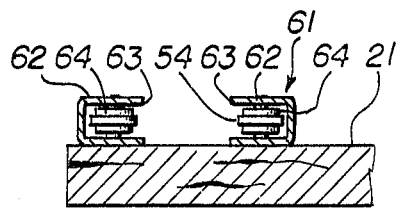
Fig.5
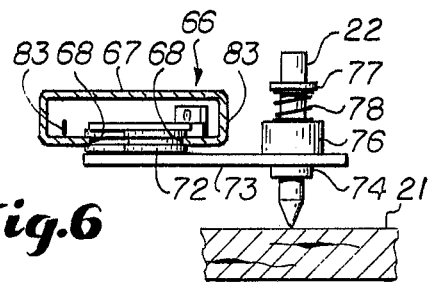
Fig.6
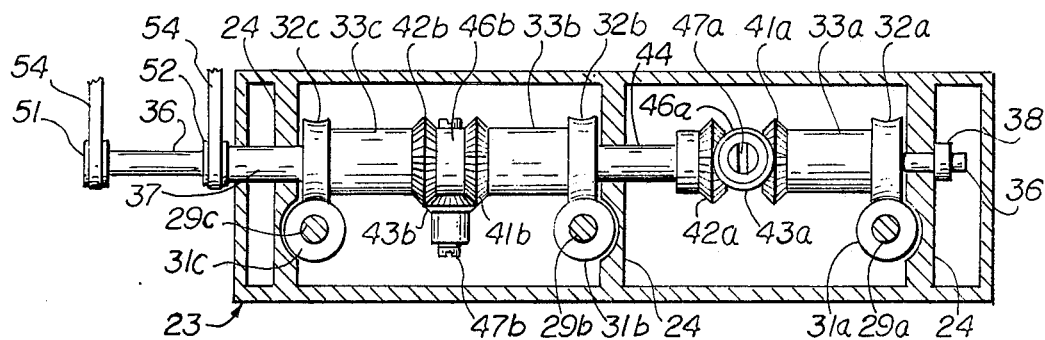
Fig.4
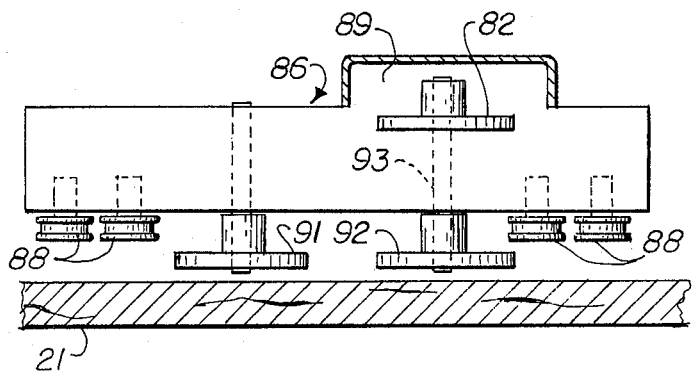
Fig.7
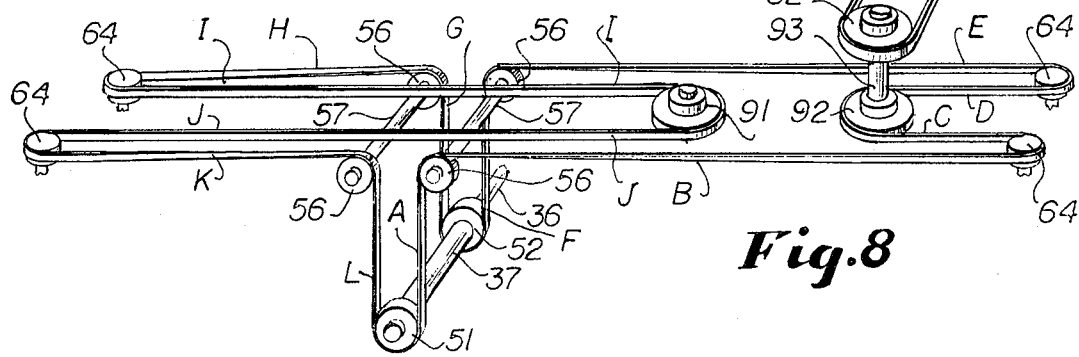
Fig.8
| | 1 | 2 | 3 | 4 | 5 | 6 | 7 | 8 |
|---|---|---|---|---|---|---|---|---|
| 52 PULLEY | 25 ← | 12.5 ← | 0 ○ | 12.5 → | 25 → | 12.5 → | 0 ○ | 12.5 ← SPEED |
| PENCIL DIRECTION | ↖ | ← | ↙ | ↓ | ↘ | → | ↗ | ↑ |
| 51 PULLEY | 0 ○ | 12.5 ← | 25 ← | 12.5 ← | 0 ○ | 12.5 → | 25 → | 12.5 → SPEED |
Fig.9

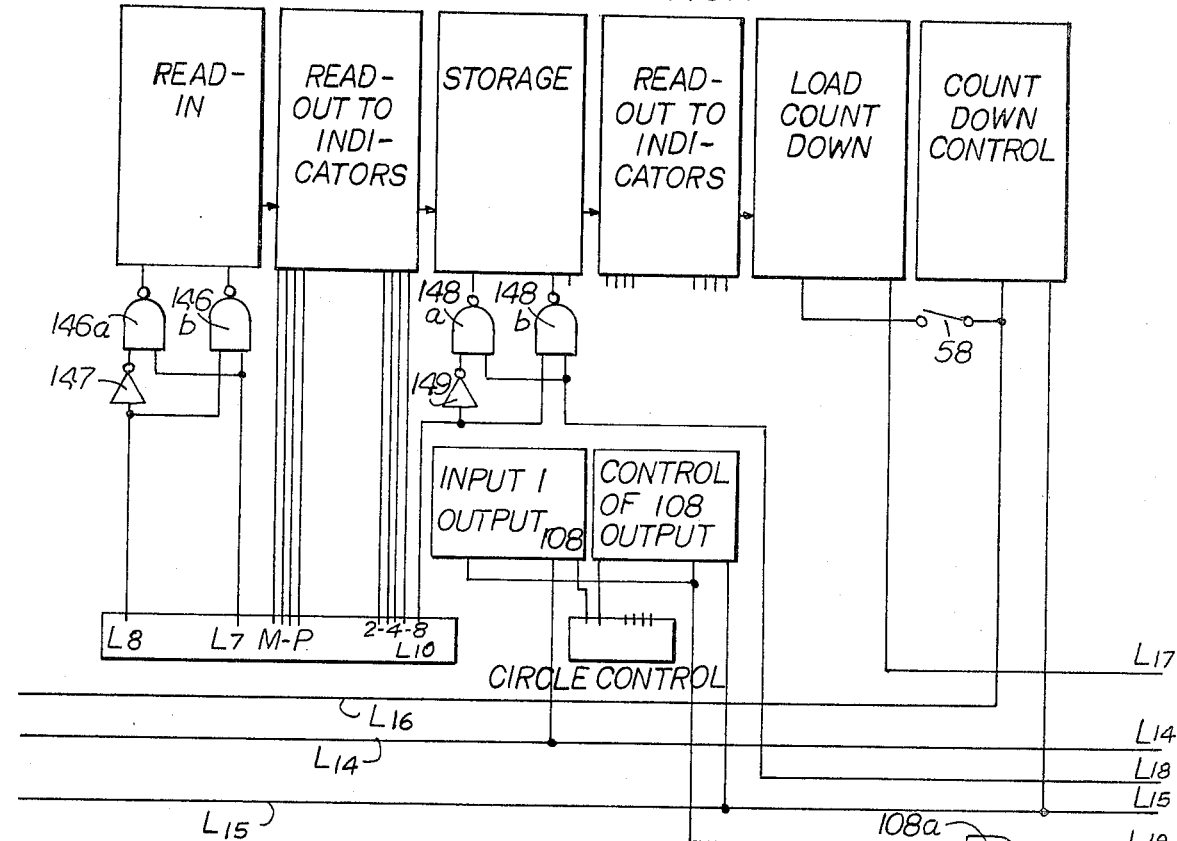
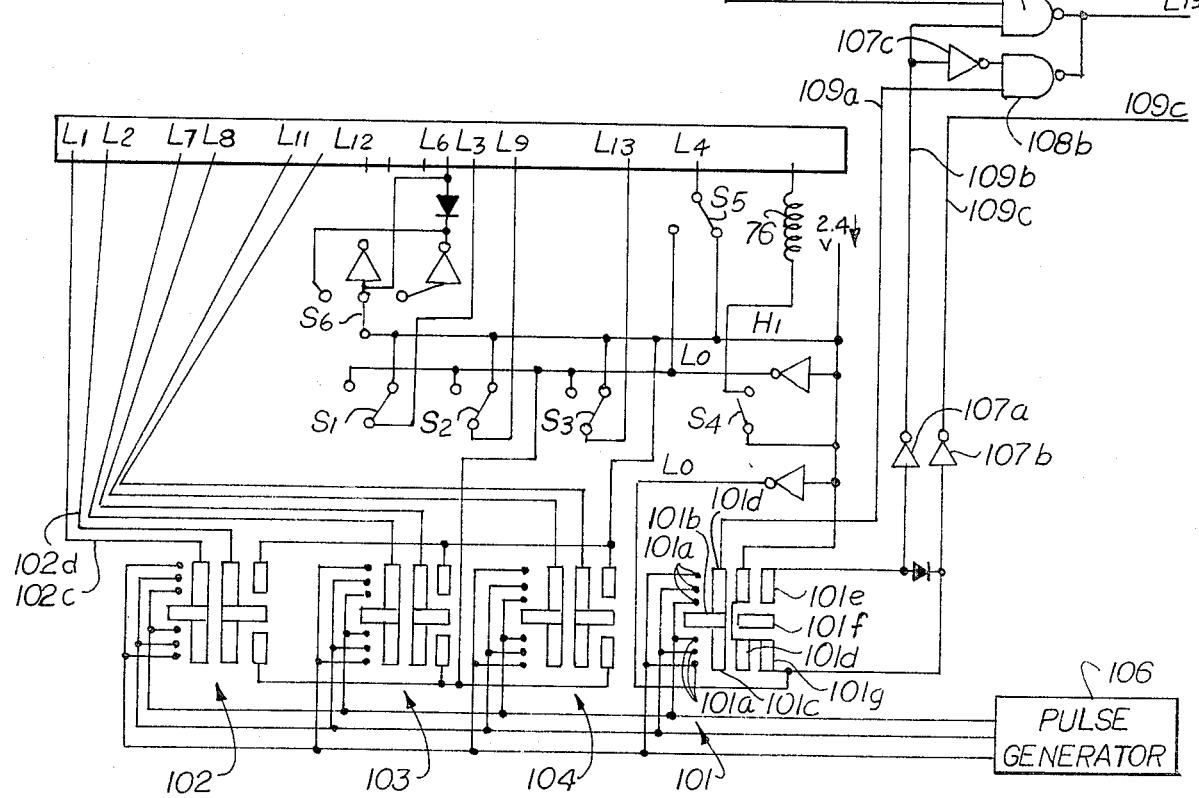
Fig. 10A

DIGITALLY CONTROLLED DRAFTING MACHINE

This invention relates to a new and improved digitally controlled drafting machine. The machine eliminates many hand operations performed in conventional mechanical drafting. A pencil or pen (hereinafter "pencil") is controlled by electric circuitry which controls the speed of rotation of two variable speed servomotors which, together with a constant speed motor, move the pencil along either or both an X-axis and a Y-axis.

The pencil may be controlled to draw vertical or horizontal straight lines or straight lines at any desired angle to the horizontal. In addition, the pencil may draw circles or circular arcs of varying radii. Still further, the pencil may be controlled to draw a spiral curve or, at least, one other curve of a predetermined geometric shape, such as a logarithmic spiral.

Initially, the operator may program into memory the dimensions which control the shapes of the various curves. Such controls may also be used to raise or lower the pencil relative to the paper, or to stop the entire operation. The operator may also adjust four other controls to determine the angle which the pencil moves to the horizontal and the spiral or logarithmic spiral movement of the pencil, as well as vertical (up and down) movement. Visual digital displays inform the operator of the condition of the memory of the electronic circuitry of the machine and also provide a visual display of the direction in which the machine is causing the pencil to operate.

As stated, there are three servomotors controlled by the electronic circuitry. One is a constant speed motor, and the other two control the motion of the pencil horizontally and vertically, respectively. Through a gearing system hereinafter described in detail, the three motors drive two pulleys, the speed and direction of rotation of which are controlled by the relative speeds of the two motors to each other and also relative to the constant speed motor, which rotates slower than the speed of the variable speed motors.

Circles are drawn by very small movements of the pencil on the X-Y axis which produce, for practical effect, the apperance of a circle. Such movement is controlled by the electronic circuitry, which circuitry controls the radius of the arc being drawn and the location around the circumference of the circle which the pencil is momentarily following.

Similarly, other circuitry controls spiral and logarithmic spiral curves. Each of the foregoing circuitries has read in, storage and countdown functions, as hereinafter explained.

Other objects of the present invention will become apparent upon reading the following specification and referring to the accompanying drawings in which similar characters of reference represent corresponding parts in each of the several views.

In the drawings:

FIG. 1 is a plan view of the apparatus, partially broken away to reveal details of construction.

FIG. 2 is a fragmentary sectional view taken substantially along the line 2—2 of FIG. 1.

FIG. 3 is a fragmentary sectional view taken substantially along line 3—3 of FIG. 1, partially broken away to reveal internal construction.

FIG. 4 is a sectional view taken substantially along line 4—4 of FIG. 1.

FIG. 5 is a fragmentary sectional view taken substantially along line 5—5 of FIG. 1.

FIG. 6 is a fragmentary sectional view taken substantially along line 6—6 of FIG. 1.

FIG. 7 is a sectional fiew taken substantially along line 7—7 of FIG. 1.

FIG. 8 is a schematic perspective view of the belts and their drives used in the preferred embodiment of the invention.

FIG. 9 is a chart illustrating features of operation of the invention.

FIGS. 10A to 10E, inclusive, are composite portions of a block diagram of the electrical circuitry of the invention.

Figure 11:
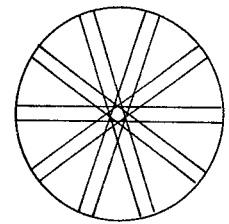

FIG. 11 is a schematic illustating formation of a circle in accordance with the invention.

Motors and Motor Drives

The motors and their drives are disposed below a board 21 or drafting table above which moves a pencil 22 controlled by the motors and their drives hereinafter explained.

Mounted below board 21 is a casing 23 divided interiorly by partitions 24. Attached to the exterior of casing 23 are three motors, 26, 27, 28, all disposed at right angles to the casing 23. Motor 27 is constant speed. Motors 26 and 28 are variable speed, their maximum speed greater than that of motor 27. Motors 26, 27, 28 have shafts 29a, 29b, 29c which extend interiorly of casing 23 and carry on their inner ends worms 31a, 31b, 31c, respectively, which mesh with worm wheels 32a, 32b, 32c.

Referring particularly to FIG. 4, it will be seen that there are hollow, relatively large diameter couplings 33a, 33b, 33c mounted at right angles to shafts 29 and to which are fixed worm wheels 32a, 32b, 32c, respectively. Inner shaft 36 extends parallel to the table 21 and projects beyond one end of casing 23. Concentric with shaft 36 is a hollow shaft 37 which extends from the interior to the exterior of the casing 23. Collars 38 fixed to shaft 36 prevent axial movement. Fixed to the end of coupling 33a opposite worm wheel 32a is a bevel gear 41a. Spaced from gear 41a is a matching bevel gear 42a. Gear 42a is connected to gear 32b by hollow shaft 44. Interposed between gears 41a and 42a is an idler bevel gear 43a. Gear 43a is rotatably mounted on a stub shaft 47a which is fixed to collar 46a which, in turn, is fixed to shaft 36. If there is a speed differential between gears 41a and 42a, (i.e., between motors 27 and 28) gear 43a, as it revolves, causes collar 46a to turn shaft 36.

Coupling 33b, which is fixed at one end to worm wheel 32b, carries bevel gear 41b at its opposite end. Spaced from gear 41b is gear 42b which is fixed to coupling 33c. Interposed between gears 41b and 42b is idler beveled gear 43b. Gear 43b is rotatably mounted on shaft 47b, the inner end of which is fixed to collar 46b fixed, in turn, to hollow shaft 37. Again, if there is a relative movement between gears 41b and 42b (i.e., between motors 26 and 27) idler gear 43b is caused to rotate and this, in turn, causes collar 46b and hollow shaft 37 to rotate accordingly.

Since motor 27 turns at constant speed (and hence bevel gear 41b turns at constant speed) and since motors 26 and 28 turn at varying speeds (but always in the same direction), by adjusting the speeds of motors 26 and 28 relative to each other and relative to motor 27, the shafts 36 and 37 may be caused to rotate at different speeds and in different directions.

On the outer end of casing 23 are pulley 51 fixed to inner shaft 36 and pulley 52 fixed to hollow shaft 37, these pulleys rotating with their respective shafts. The pulleys 51 and 52 are located immediately below openings 53 in board 21. Drive belt 54 (hereinafter described in considerable detail) is reeved around pulleys 51 and 52. Stretches of belt 54 extend vertically upwardly through openings 53 and are guided onto horizontal paths (i.e., parallel to the board 21) by guide pulleys 56 mounted on shafts 57 in the openings 53.

X- AND Y-AXIS TRACKS

X-axis track 61 shown in detail in FIG. 5 consists of two channels 62 fixed to the top of board 21 and facing inwardly. The inner upper edges 63 of the channel 62 constitute tracks as hereinafter explained. At each end of channel 62 is a pair of end pulleys 64 around which the belt 54 passes.

Extending at right angles to the track 61 is the Y-axis track 66 shown in detail in FIG. 6. Track 66 has an inverted channel 67, the lower end of which has inward turned flanges 68. Sliding longitudinally (i.e., on the Y-axis) in track 66 is pencil arm carrier 71. Three grooved wheels 72 are rotatably mounted in carrier 71 and engage the in-turned flanges 68 so as to guide the carrier 71 in its path. Extending outward of carrier 71 is a pencil mounting arm 73. Arm 73 carries a vertical axis bushing 74 through which pencil 22 reciprocates. A solenoid 76 or other means causes the pencil to be lifted from the paper (which is mounted on board 21) or to be depressed to engage the paper. A collar 77 fixed to pencil 22 engages one end of coil spring 78 which returns the pencil to up position against the action of solenoid 76.

Rotatably mounted in channel 67 at its lower or outer end is outer pulley 81. Adjacent the opposite end of channel 67, as hereinafter explained, is inner pulley 82. Belt 83 travels around pulleys 81 and 82 and is fixed to the carrier 71 so that, as the belt 83 turns, it causes the pencil to move along the Y-axis of the board 21.

Attached to the upper end of track 66 is the Y-track mount 86 which slides in the X-axis track channel 62. Mount 86 has a body 87, best shown in FIG. 7, to which are rotatably mounted grooved wheels 88 which are supported by the inner edges 66 of channel 62. There is a upward extending boss 89 on body 87 to which the channel 67 is fixed. Upper pulley 82 is rotatably mounted within the body 87. Also, rotatably mounted in body 87 are left pulley 91 and right pulley 92 around which belt 54 passes. Pulleys 82 and 92 are fixed to a common shaft 93 journalled in body 87 so that they rotate together.

The lower end of Y-axis track 66 may be supported by means of a support 96 having a roller 97 which bears upon the paper or board 21.

OPERATION OF PULLEY DRIVE

Directing attention of FIG. 8 and bearing in mind that the speed and direction of rotation of pulley 51 is dependent upon the relative speeds of motors 28 and 27 and that the speed and direction of rotation of pulley 52 is dependent upon the relative speeds of motors 26 and 27, it is first desirable to trace the path of belt 54 around the various pulleys. Commencing arbitrarily on the underside of pulley 51, the belt extends vertically upward in stretch A through the opening 53 in board 21 and thence over the right top guide pulley 56 horizontally to the right as viewed in FIG. 8 in stretch B around the right top end pulley 64, thence backward in stretch C around pulley 92, thence in stretch D around the right lower end pulley 64, horizontally in stretch E along the X-track 61, down around right inner drive pulley 56 in stretch F, thence under pulley 52, thence in stretch G upward and around the left lower pulley 56, thence in stretch H longitudinally of the X-axis track 61 to the left lower end pulley 64, thence in an elongated stretch I around pulley 91, thence returning in stretch J around the left upper pulley 64, back over guide pulley 56 in stretch K and thence down through the opening 53 in stretch L to the underside of pulley 51 (the point of origin).

Assuming, for purposes of illustration, that pulley 51 is turning clockwise as viewed in FIG. 8 and that pulley 52 is stationary, then the stretch B is moved to the left and stretch C is moved to the right. Since stretch D is not moving, this causes pulley 92 and body 87 and pulley 91 to be moved to the right as viewed in FIG. 8 and this, in turn, causes the pencil 22 to move along the horizontal (X-axis) line on the paper on the board 21. Since, however, there is relative movement between stretches C and D, pulley 92 turns, turning belt 83 and thus also causing pencil 22 to move on the Y-axis. The combination of the two movements in a 45° line on the paper. If the direction of rotation of pulley 51 were counterclockwise, (and pulley 52 stationary) the stretch J would be moved to the left causing the pencil 22 to be moved on the X-axis to the left. Since stretch D is stationary, pulley 92 turns, moving stretch C to the left and stretch B to the right.

If pulleys 51 and 52 were both turning clockwise and at the same speed, then identical tension would be applied to the body 87 by stretches C, D, I and J. Thus the pulleys 91 and 92 would not rotate at all and this would cause the belt 83 to remain stationary causing the pencil 22 to draw a horizontal (X-axis) line.

When pulleys 51 and 52 are rotating at different speeds and/or directions, then the pencil 22 is caused to move in paths other than the X-axis and Y-axis by a combination of movement of body 87 along the X-axis track 61 and a rotation of pulley 82 which causes a movement of the pencil 22 relative to the X-axis and Y-axis together.

FIG. 9 is a table explaining how the relative speeds and directions of pulleys 51 and 52 affect the direction of movement of the pencil 22. On the top line of the table are eight different possible conditions (selected out of an infinite number of conditions). The second line of the table shows for pulley 52 its speed, and by means of arrows, its direction, the arrows to the left indicating counterclockwise movement (as viewed in FIG. 8) and the arrows to the right indicating clockwise movement and the symbol "0" indicating that there is no movement of the pulley. An arbitrary speed of 25 designates maximum speed of the pulley.

The third line of the chart shows by means of arrows the direction the pencil moves in each of the eight conditions. The bottom line of the chart shows for pulley 51 the direction of rotation and the speed of rotation, using symbols similar to what has been used in the second line of the chart.

Turning attention now to column 1 of the chart, when pulley 52 is turning at its full speed and pulley 51 is stationary, pencil 22 is directed at a 45° angle up-left relative to the X and Y axes. Under condition 2, pulley 52 is turning counterclockwise at half speed and pulley 51 is also turning countercloskwise at half speed. Such movement causes stretches I and J to move to the left at equal speed, causing the body 87 to move to the left. At the same time, stretches E and B are moving to the right at equal speeds. Hence, there is no rotation of pulley 92 or 82 and no movement of pencil 22 along the Y-axis. Pencil 22 thus moves on the X-axis to the left.

Considering now condition 3 in the chart of FIG. 9, it is assumed that the pulley 52 is stationary and the pulley 51 is turning counterclockwise at full speed. This results in a 45° angle movement down-left of the pencil 22 as shown in the Table. Such movement is caused because the body 87 is moving to the left and at the same time the pulley 92 is turned.

The other positions of the chart of FIG. 9 can be understood by analysis similar to that of the first three positions.

Directing attention again to the condition of FIG. 8, when the pulley 92 moves far enough to the right so that the left side of the pulley is tangent to a line tangent to the right sides of end pulleys 64, no further movement of the body 87 will occur and, furthermore, the pulley 92 will not turn. At the opposite end of the travel of the body 87, when the right side of pulley 91 is tangent to a line tangent to the left sides of end pulley 64, movement of the body 87 and rotation of pulley 91 will cease. These are safety stops for the operation of the machine.

Although pulleys and belts are illustrated and have been described, other drive means, such as sprocket belts and sprockets and chains, may be used.

ELECTRICAL SYSTEM

The control of the speeds of motors 26 and 28 relative to each other and to the continuous speed of motor 27 is accomplished by controls and circuitry hereinafter described and illustrated in FIGS. 10A to 10E. It will be understood that the circuitry is subject to wide variation, as will readily occur to one skilled in the art.

Switches and indicators are preferably located in a console (not shown) which may be portable so that it can be placed in a convenient location on the drawing board 21 itself, or on a desk or other support adjacent thereto. Preferably, the console contains four rocking switches, eleven additional switches, visual display lamps which indicate the read-in and read-out of sub-circuits and a further indicator showing the direction in which the pencil 22 is moving. By manipulation of the various switches and observation of the visual display, the operator controls movement of the pencil 22.

Movement in a straight line has been explained previously in the specification of this invention. The machine will also make curved lines and specifically circles, spirals, and logarithmic spirals. In drawing any curved line, the machine actually draws a short straight line connected at either end to other straight lines disposed at slightly different angles. For a circle, each of the straight lines is of the same length. For the other curves, the lengths of the lines vary.

A complete circle, in accordance with the preferred embodiment of this invention, consists of one hundred short straight lines joined end to end. In the "Power Control Section" hereinafter described are two sets of up-down counters, each set of which counts up to 10,800 and back down to 0. One set controls motor 26, the other motor 28. The figure, 10,800 is chosen as one-half the number of minutes in a complete circle. The lower set follows one quadrant (one-quarter circle) behind the upper. Thus, in drawing a circle, at 0° the X-axis motor is at minimum speed and the Y-axis at maximum, and this reverses at each quadrant. In the "Circle Control Section" hereinafter described, the pulses from the Power Control Section move 108 times and this provides 100 settings for the circle, spiral and logarithmic spiral, the difference merely being the duration of movement of the pencil at each angle.

To control the diameter of the circle, the integrated circuits of the Circle Section of the block diagram count numerically from 1 to 1,000,000. Choosing the number 1,000 forms a circle 0.1 inches in diameter; 10,000 provides a circle 1 inch in diameter; 1,000,000 provides a circle 100 inches in diameter.

To draw a spiral, the "Spiral Section" hereinafter described adds 100 counts for each 1 count per step of the circle. This draws a circle 1-100th inch larger than at the start, regardless of the diameter of the circle. For the logarithmic spiral, the Logarithimic Section of the circuitry adds counts into the Sprial Section which are increased and added into the Circle Section, drawing the logarithmic spiral.

Directing attention to the block diagram FIG. 10A, rocking switch 101 controls the straight line functions of the machine and, in effect, controls the Power Control Section. Rocking switch 102 controls the radius of the circle. Switch 103 controls the spiral section and switch 104 controls the logarithmic spiral section. Each of these switches, as hereinafter explained, connects pulse generator 106 to the read-in or up-down count of the particular section. When a switch 101-104 is on, it counts up or down.

Two-position switch S1 connects the circle section storage to either high or low voltage. When in the low position shown, it is neutral (inoperative). When in opposite position it transfers all numbers counted in the Circle Section read-in to Circle Section storage.

Switch S-2 when in neutral disconnects the Spiral Section storage and when in opposite position loads the storage of the spiral section from its read-in.

Switch S-3 controls the logarithmic spiral. It also has a neutral position and a position to load the storage of the logarithmic spiral section from its read-in.

Switch S-4 controls the solenoid 76 which raises and lowers the pencil 22. When the pencil 22 is in raised position, the machine will operate to reposition the pencil, but no line will be drawn.

Switch S-5 controls the count of the storage of the circle and the spiral (but not the logarithmic spiral) and its position determines whether the count is up or down.

Switch S-6 is a 3-position switch. In left position it controls the countdown of the circle sub-section, in right position it clears the circle countdown in order to stop the circle function and in the middle position, it is neutral.

Switch S-7 stops the logarithmic spiral function. Switch S-8 stops the spiral function.

Switch 9 is a double pull, single throw off-on switch controlling the motors 26 and 28. When this switch is open, the drive of the pencil stops.

Switch S-10 is a doubledeck switch used to select different scales for any drawing. In effect, it is a motor speed control and simultaneously controls the speeds of both motors 26 and 28.

Switch S-11 is an off-on switch for the entire machine.

POWER CONTROL

Pulse generator 106 generates three different pulses (varying in speed) and each pulse is connected to two contact points 101a in switch 101 (as well as in switches 102, 103 and 104). Outer wiper 101b, which is in continuous contact with contact 101c, may make contact with any of the six point contacts 101a shown, the inner two being to the slowest of the pulses of the pulse generator 106, the intermediate two being to a faster pulse and the outer two being to the fastest pulse of the pulse generator. Contacts 101d are connected to the low voltage. Contact 101e is connected to the inverter of "hex" circuits 107a and b (which reverse from high to low voltage) and NORD gates 108a, b shown on the diagram. Thus contact 101f transmits 108 pulses at a time to the Circle Section and one at a time for the direction or power control. Control 101g connects to hex circuit 107b and thus to the Power Control Section. Contact 108f contacts either 101e or 101g. Contacts 101b and 101f reverse from high to low for clockwise or counterclockwise movement of the pencil 22. By moving contacts 101b and f (which are physically joined for simultaneous movement) speed of pulses and either high or low voltage are controlled.

Although not described in detail, switches 102, 103 and 104 function similar to switch 101, except that there is no neutral portion between high and low between contacts 101e and 101g.

Directing attention to the Power Control section, there are identical circuitries (not shown in complete detail) for each of the motors 26 and 28. Directing attention to the uppermost of the two sections illustrated, (for motor 28) there are four up-down counter integrated circuits in the block marked "up-down counters". In these particular integrated circuits, the up-down counts to 16 instead of to 10 as in the other circuits which are hereinafter described.

108 pulses are directed into the Power Control by means of switch 101. When the direction switch 101b is closed, line 109a goes low and stops the count through NORD gates 108b; the high goes through NORD gate 108a. The pulse goes either from gate 108a or gate 108b to gates 111 and is high or low depending on the position of the direction switch 101. All four of the NORD gates 111 operate together. The leftmost NORD gates 111c and 111d operate the up-down count of the integrated circuitry for motor 28, while the right hand two gates 111a and 111b operate the up-down count of the integrated circuit for the motor 26. The two operations are set ¼ quadrant behind each other by means of NORD gate 112 which sets the bottom block marked Up-down Counters ¼ pulse behind the upper block.

Gate 116 controls the top four integrated circuits so that when these count down to 0 then, through gate 118, the double flip-flop 121 is changed, changing the gates 111 from high to low or vice versa. The gate 117 functions similar to the gate 116 for the integrated circuits making up the lower Up-down Count block. Gate 119 is wired to 10,800 and when this number is reached, the gate 119 through the gate 118 changes the double flip-flop 121 and reverses from up count to down count.

Figure 10B:
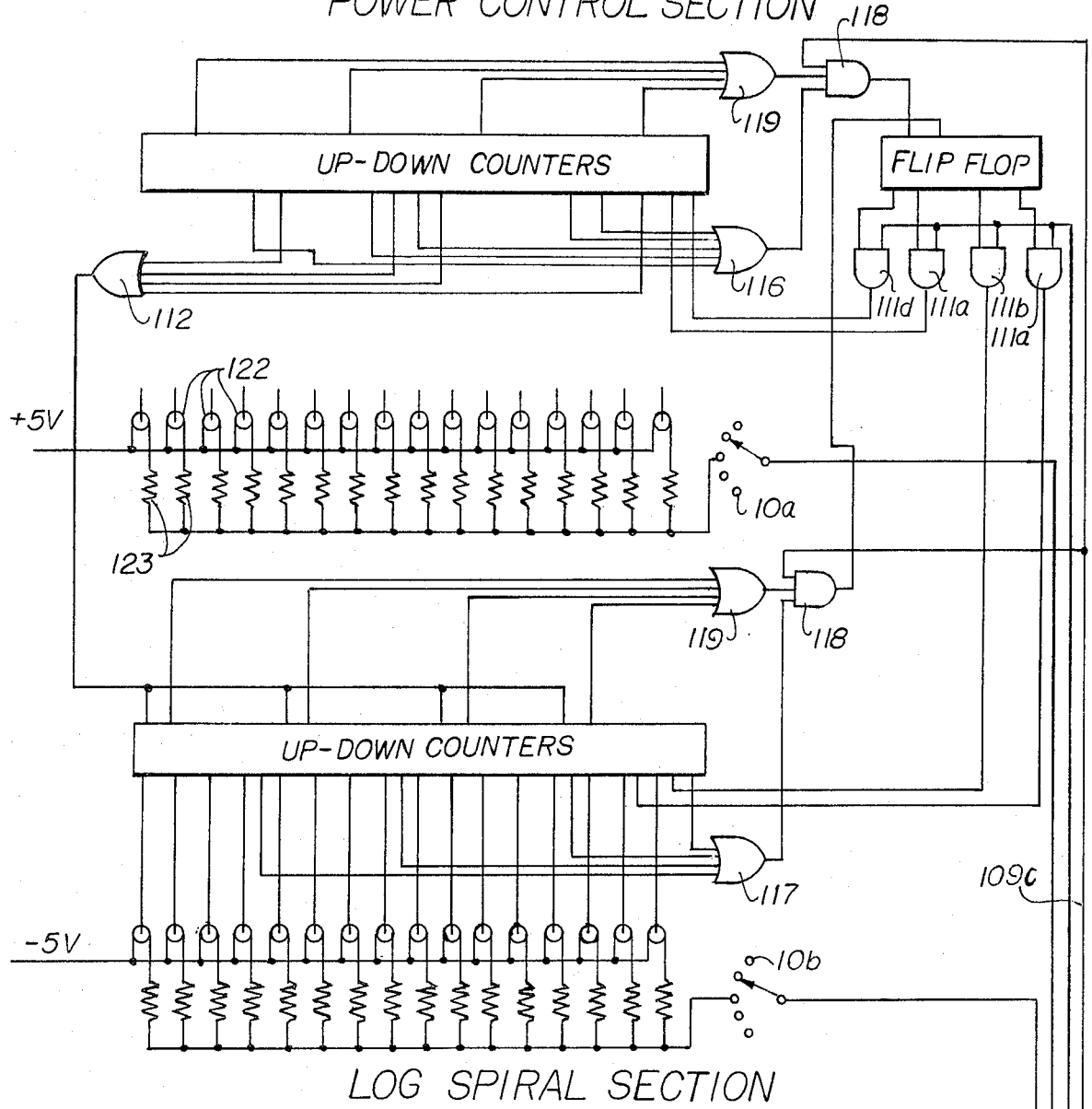

The up-down count is comprised of four integrated circuits and each has four transistors 122 which turn off or on a corresponding resistor 123. The resistors 123 control the current to motor 26 (or 28) through switches S10a and S10b and govern the speed of the motors. In FIG. 10B the transistors 122 and resistors 123 connect to only one of several contacts of switch S10a (or S10b). It will be understood that each of the several contacts has its own set of transistors and resistors, each transistor being activated by one of the Up-Down Counters of the Power Control Section.

MOTOR DRIVE AND POWER INPUT

Figure 10C:
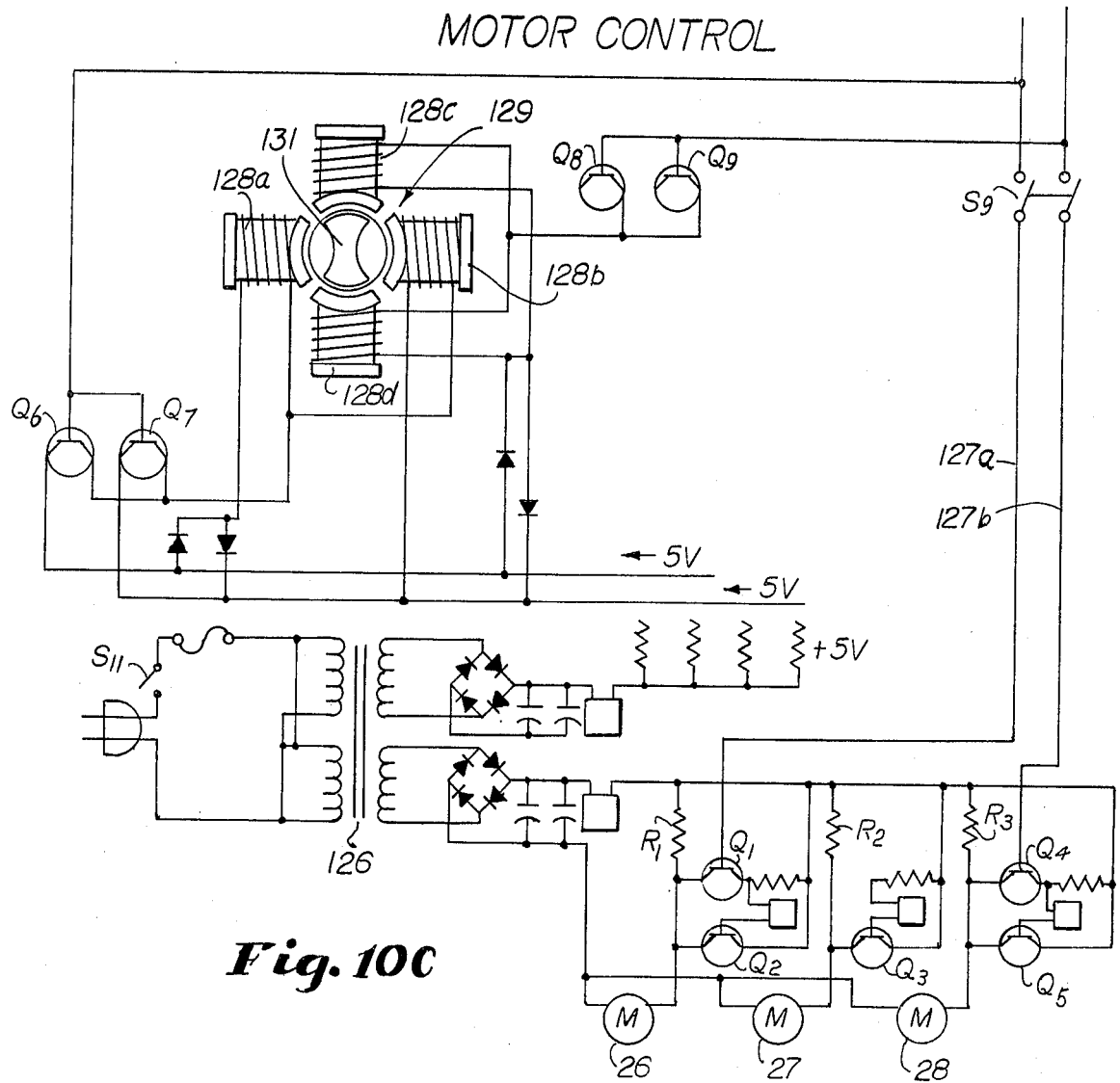

Line current energizes transformer 126 which has two secondary coils. The upper of these secondary coils provides a direct current high voltage (e.g. 5 volts) throughout the system. The lower secondary coil of the transformer provides direct current to the motors 26, 27 and 28. A suitable control is illustrated in FIG. 10c. Resistor R-1 establishes the amount of current to hold motor 26 below the speed of motor 27. Wire 127a comes from the Power Control Section via switch S9 and the current flowing therethrough is determined by the number of resistors 123 which are turned on by the lower Up-Down Counter block and the setting of switch S10b. Wire 127a is connected to the base of transistor Q1. As the number of resistors 123 connected into the circuit increases or decreases, this correspondingly decreases or increases the current to the base of Q-1 and controls the amount of current going to motor 26, thereby controlling the speed of motor 26. Transistor Q2 is off when transistor Q-1 is on. When Q-1 is off, Q-2 is on an equalizes the speed of motor 26 with the speed of motor 27.

Transistor Q-3 regulates the speed of motor 27 constant.

Similarly, the current coming from line 127b controls the speed of motor 28 through transistors Q4 and Q5.

The small squares shown in the wiring diagram in this vicinity represent adjustable potentiometers which are not manually controlled during normal operation of the machine.

DIRECTION INDICATOR

Line 127a is also connected through switch S7 to the bases of two transistors Q6, Q7 which control current through two opposed coils 128a, 128b of the indicator 129. Line 127b is connected to the bases of the two transistors Q8, Q9 which control current through the opposed coils 128c, 128d of the direction indicator 129 which are positioned 90° from the first mentioned coils. The permanent magnet 131 positioned within the coils 128 is connected to a pointer (not shown). This pointer indicates the direction of movement of the pencil 22 relative to X-Y axes.

THEORETICAL CONSIDERATION OF CURVES

Referring to FIG. 11 there is shown a representation of how a circle is drawn. It will be seen that the lines establishing the circle are in fact straight lines and that adjacent straight lines are disposed at different angles. Change in time occurs each 108 pulses. The length of the line (time during which the pencil travels) is established by the countdown function of the Circle Section of the wiring diagram hereinafter described. The radius at the commencement of the drawing of the first line of the circle is controlled by switch 102. One of the features of the present invention is the fact that the Circle Section (or other sections) may be set up while the machine is performing other functions.

For spirals and logarithmic spirals, essentially the same principles apply, except that the angles are different.

CIRCLE SECTION

Pulse generator 136 emits 1,000,000 pulses per second. This permits drawing straight lines in 10,800 directions. to draw a circle, however, only 100 directions are required and only 100 are used herein.

Figure 10D:
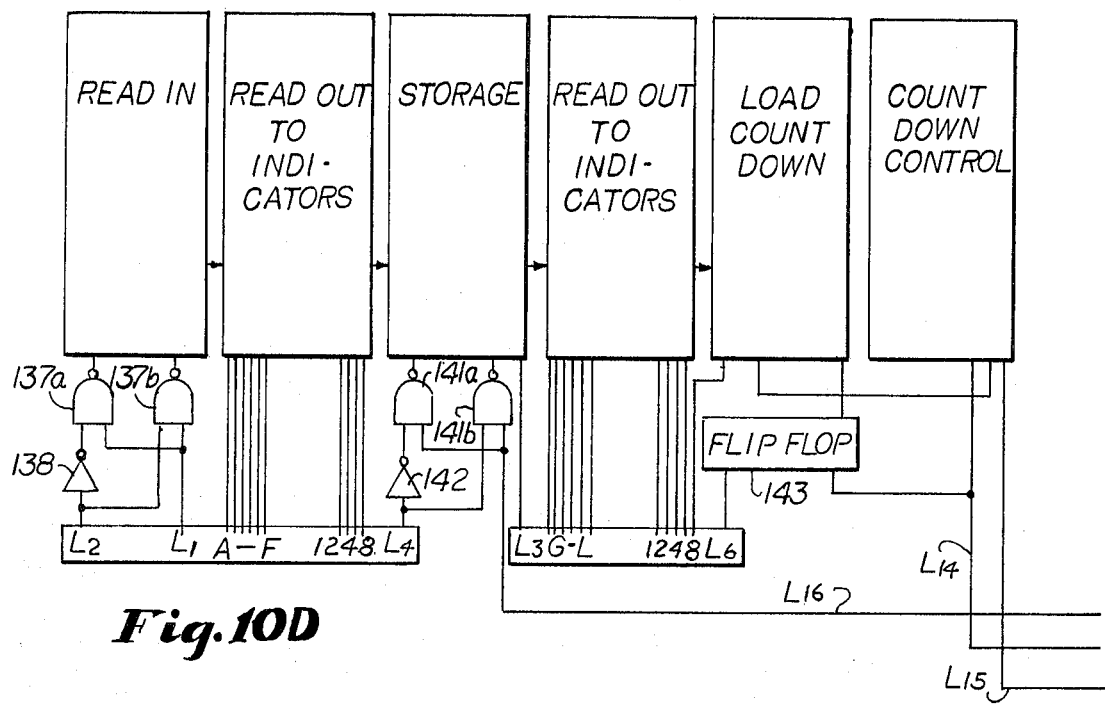

Directing attention now to the Circle Section of FIG. 10D the Read-In block represents six separate integrated up-down counter circuits appropriately wired. Thus, one circuit covers the numbers 0 to 9, another 10 to 90, a third 100 to 900, the next 1,000 to 9,000 the fifth 10,000 to 90,000 and the sixth 100,000 to 900,000.

The signal from contact 102c,d of switch 102 enters NAND gates 137a and 137b. The hex circuit 138 is connected to NAND gates 137a and to line L2 which extends from contact 102d of switch 102. The function of the hex circuit 138 is to reverse from high to low. The two NAND gates 137 are connected into the first of the up-down counters of the read-in and the various up-down counters are connected together so as to count pulses up to 900,000.

There are six read-out counters for LED indicators of the Display Section (hereinafter described) which are connected to the corresponding up-down counters of the read-in of the Circle Section. The operator manipulates switch 102 until the LEDs show the proper reading of the circle section read-in whereupon switch 102 is returned to neutral.

The next step is to transfer the read-in to storage. Switch S-5 controls the up-down count storage for the circle (as well as the spiral sections). The NAND gates 141a, 141b and hex circuits 142 operate in essentially the same manner as in the read-in section. Storage also contains six up-down counters.

Figure 10E:
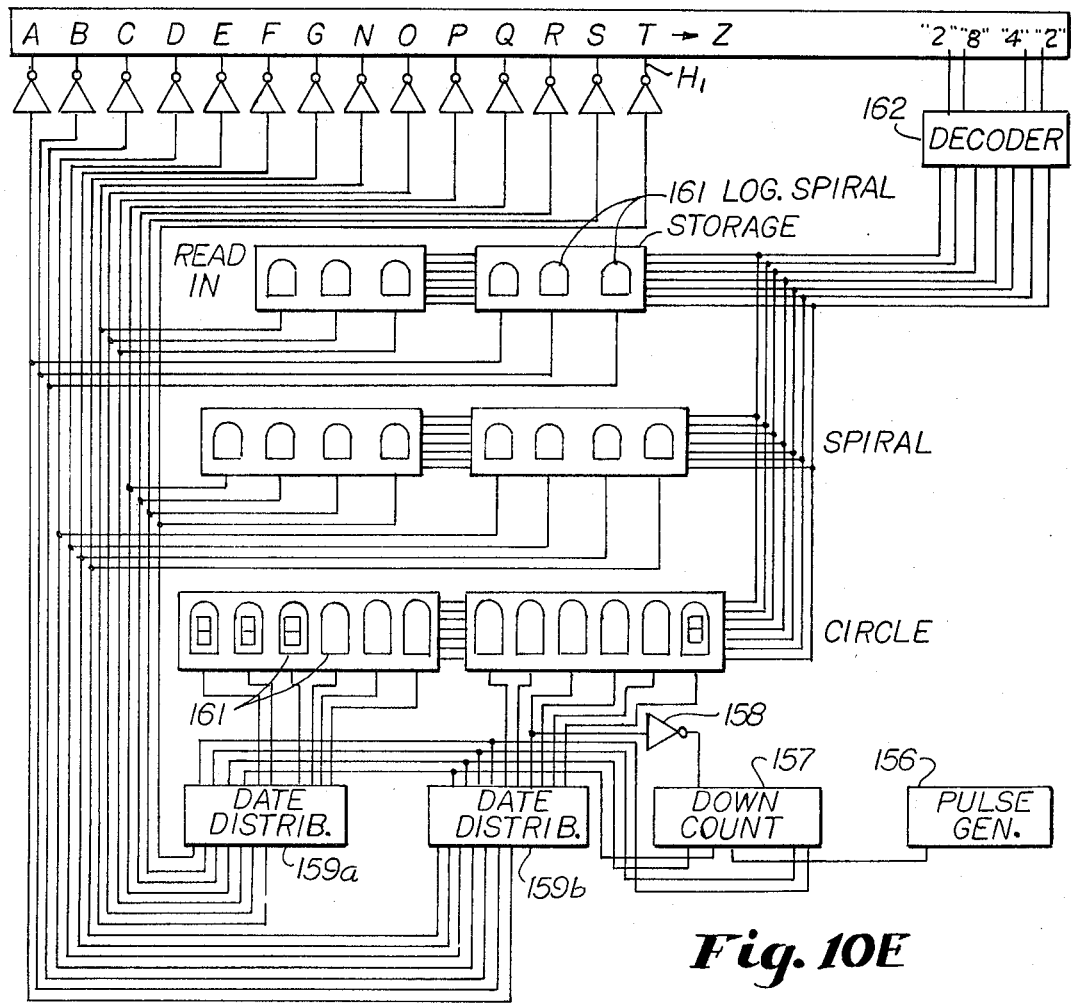

There is also a read-out to indicators for the storage section and, in turn, connected to the circle storage indicators shown in FIG. 10E. Thus, the operator may visually determine at any time the circle storage.

The pulses from the output of the Circle Control travel through the NORD gates 108a,b and are pulses leading to the four NORD gates 111a–d in the Power Control Section. By means heretofore explained, these control the speeds of the two motors 26 and 28 and also the length of time the motors continue to operate at each angular position. It will thus be seen that, if neither switches 102, 103 nor 104 are on, switch 101 controls the direction of the line drawn by pencil 22 and the length of the line.

While other operations are continuing, the operator, by control of switches 102–104 may control read-ins to the Circle, Spiral and Logarithmic Spiral read-in blocks using the read-in indicator lamps 161 to determine when the proper circle diameter spiral increment or logarithmic spiral increment is reached.

The functions of switches S9 and S10 have heretofore been explained.

The Load and Countdown section of the Circle Section consists of six up-down counters connected to the corresponding ICs in the storage section. The countdown function is controlled by switch S6. The storage is not removed during the countdown so that it may be repeated as required. Flip-flop 143 changes from high to low and automatically reloads the load and countdown block. The countdown block times the function of the pencil 22 and reloads when it reaches 0.

The countdown control of the Circle Section consists of six OR gates (not shown) connected in series and also to the six individual counters of the load countdown block. The lowest of these OR gates is connected to the adjacent OR gate through a hex circuit. When there are any numbers in the storage block counters, the inverter or hex circuit (which has high voltage at its input and low at its output) functions so that when the read-out is low (i.e., empty) then the input of the hex circuit is low and its output is high. This stops the train of pulses from the circle control and changes flip-flop 143.

Pulse generator (136) emits 1,000,000 pulses per second. The block marked "Input 1 Output 108" in the Circle Control of FIG. 10D contains two counters which are loaded by the signals from the countdown control of the Circle Section when it goes low. These integrated circuits are wired to a maximum of 108. When they are loaded at 108 they then count down to 0.

The 108 pulses which count down from the circle control Input 1 Output 108 block travel through the control of 108 Output block, which consists of two NORD gates and a hex circuit (not shown) and thence to the NORD gates 111 which control the double flip-flop 121 of the Power Control Section. These function to control the motor speed as heretofore explained.

SPIRAL SECTION

Referring to FIG. 10A, the spiral section is shown. Many of the features of this section are similar to those in the Circle Section. The read-in portion consists of four up-down counters. Gates 146a, b and hex circuit 147 function similar to gates 137a,b and hex circuit 138.

The read-out to indicators for the spiral read-in indicator lamps consists of four counters. The storage block consists of four counters, which store whatever is read into the read-in section from the switch 103. The NAND gates 148a,b and hex circuit 147 connected to the spiral storage function similarly to the corresponding gates 141a,b and inverters 142 in the storage of the Circle Section. Similarly, the Read-Out for the storage indicator is connected to the appropriate up-down counters of the spiral storage.

In the countdown portion of the spiral sub-section there are four up-down counters appropriately connected to the corresponding up-down counters in the storage section.

The countdown control for the spiral section consists of four OR gates and a hex circuit somewhat similar to the corresponding portion of the Circle Section, except that this control does not contain a flip-flop similar to 143. Switch S-8 stops the spiral countdown and is manually controlled.

When the spiral countdown is counting down, it sends a train of pulses which counts into the circle storage and specifically to NAND gates 141a,b. The train of pulses results in a greater time for the circle storage being stored and thus increases the length of the line drawn by the pencil at each particular angle. More graphically, the addition to the circle storage from the spiral storage results in a greater radius from the center of the spiral at the end of each angular stroke of the pencil than would be the case with the corresponding circle alone (assuming that the instruments are counting up rather than down at this particular time).

LOGARITHMIC SPIRAL

As shown in FIG. 10B, in the Logarithmic Spiral Section read-in there are three up-down counters. The NAND gates 151a,b and hex circuit 152 controlling the three up-down counters are similar in value and function to those in the circle and spiral sections. There is a read-out for the spiral indicator lamps similar to the preceding sections.

The logarithmic storage block consists of three up-down counters appropriately connected to the corresponding counters in the spiral read-in section. These are in turn connected to read-out counters for the logarithmic spiral indicator lamps.

As long as there are any numbers in storage of the logarithmic spiral section the three OR gates (not shown) in the Reload Control block are maintained high. When the in pulse drops to low, these OR gates block the signal and do not change the flip-flop 154. On the other hand, if the three gates are low, the flip-flop 154 is changed. When the flip-flop changes, it loads the spiral countdown block.

The countdown block for the logarithmic spiral section is similar in function to those for the preceeding sections as is the countdown control block. Switch S-7 stops the logarithmic countdown.

It will be seen that the train of pulses from the logarithmic spiral section counts into the spiral section storage which, in turn, counts into the circle section storage. This logarithmically increases the lengths of the lines drawn by the pencil 22 at each angle.

INDICATOR SECTION

The indicator section is substantially conventional with other indicators of similar devices. This section has its own pulse generator 156. This feeds into the up-down counter 157 which counts up only. The hex circuit 158 is connected as indicated. There are separate data distributors 159a,b for the read-in and storage LED 161. Additionally, there are decoders 162 for all of the lamps which convert binary to visual display. A series of pull-ups 163 illuminate or enable the visual display lamps 161.

The six lamps 161 on the left side show the diameter stored in the circle storage block and the six lamps 161 on the right hand side show the read-in of the diameter of the circle. Similarly, the left four storage spiral lamps 161 show the stored increment per revolution in the spiral section and the four lamps 161 on the right side show the read-in spiral increment per revolution.

The top left logarithmic spiral lamps 161 show the storage in the logarithmic spiral section and the corresponding three lamps 161 on the right hand side show the read-in.

OPERATION

Switch 11 is closed to turn on the machine and energize all circuits. Since this is the beginning of the operation, the various sub-circuits have no read-in or storage and the indicator 129 is at 0 (vertically upward) and all of the indicator lamps 161 are on but read 0. All switches S1 to S9, as well as switches 101–104, are in the neutral or open positions shown in the drawings. Switches S10a and S10b are used to set the scale. When the contact is horizontal, the scale is 1" to 1". Moving the contact down makes the scale ½' to 1" and further down ¼" to 1". On the other hand, moving the switch up makes the scale 2" to 1" and moving it full up is 4" to 1". It is assumed that the pencil 22 is located at a point other than where the operator wishes to commence to draw a line. The first sequence of operations is to move the pencil from its original position to the point where the line will originate. For this purpose, switch S-4 is moved to raise pencil 22 from contact with the paper. Switch 101 is then moved forwardly (upwardly, as shown in the drawing). The pulses from the generator 106 then travel to the gates 111, and load the up-down counters of the Power Control Section. This causes the pointer (not shown) of the indicator 129 to move clockwise. The distance which the switch 101 is moved forward determines the speed of the pulses and hence the switch 101 is moved back down as the pointer approximately reaches the desired reading. When the proper reading of the indicator 129 is obtained, the switch 101 is moved to neutral. If it is necessary to change direction of the pointer 129 at any time, then the switch 101 is moved down (toward the bottom of Fig.).

When the pointer of indicator 129 is in the proper direction, switch S-9 is closed. This energizes motors 26 and 28 (motor 27 having been energized as soon as switch S-11 was closed) and causes the pencil 22 to move along the path indicated by the pointer of indicator 129. When the desired point of origin is reached, switch S-9 is opened, stopping the pencil. Thereupon, switch S-4 is changed in position to lower the pencil to the paper.

To draw a horizontal straight line, the first operation is to move the switch 101 forward (up in the drawing) to continue clockwise movement of the pointer of the indicator 129 until it reaches the proper direction (i.e., horizontally to the right). Alternatively, the operator could move the switch 101 back (down in the drawing) and the pointer would reverse in direction until it reached the desired direction in which the first line is to be drawn. Thereupon the operator closes the switch S-9 and this energizes the motors 26 and 28 to draw a horizontal line to the right of the desired length. When this length is reached, the switch S-9 is opened, stopping the pencil 22.

If the next line is to be vertically upward, the switch 101 is moved down as viewed in the drawing, causing the pointer of the indicator 129 to move counterclockwise around to the desired direction. Thereupon, the switch S-9 is closed and the pencil moves until the desired end of the line is reached, whereupon the switch S-9 is opened.

To draw other straight lines, switch 101 is adjusted until the pointer of indicator 129 is pointed in proper direction and switch S-9 closed and opened to determine the length of the line.

To draw a circular arc, the first step is to set the radius of the arc. Switch 102 is moved up to load the read-in of the Circle Section. The lamps 161 for the read-in are observed until the proper radius is indicated, whereupon switch 102 is moved to neutral position. If, through error, there was an overrun in the radius, then switch 102 is moved to down position to reduce the radius, as required. Thereupon, switch S-1 is closed, loading the Circle Section storage from the Circle Section read-in. Again, this is checked by the indicator lights 161. The next step is to determine the direction of the circular arc—i.e., clockwise or counterclockwise. The indicator 129 may have already been set in one direction or the other from previous operations of the machine. If it is to be changed, then the switch 101 is pressed down to change the direction. The next step is to change the switch S-6 forward to load the countdown of the Circle Section so that the counters therein are in the same condition as the counters in the storage section. The operator then closes switch S-9 and leaves it closed until the desired length of arc (or complete circle) has been drawn whereupon switch S-9 is opened.

Switch S-6 is used to clear or to load the countdown of the Circle Section, depending upon the direction in which it is thrown, as shown in the block diagram. Assuming now that a spiral curve is to be drawn at the end of the circular arc, switch S-8 is closed. Switch S-5 is adjusted in position depending upon whether the spiral curve is to have in position depending upon whether the spiral curve is to have a larger or shorter radius. Thereupon, the operator pushes switch 103 forward (up as shown in the drawing) to load the read-in of the spiral section until the indicator lamps for the spiral section shows the proper increment (or decrement) as compared with the circular arc. When this is reached, switch 103 is returned to neutral position. Thereupon switch S-2 is changed in position, which loads the Spiral Section storage from the Spiral Section read-in. Again, this is observed in the indicator lamps 161 for the Spiral Storage portion of the Display Section. Thereupon, switch S-9 is closed, which control the motors 26 and 28 to draw the spiral curve. When the length of the spiral curve desired has been reached, the switch S-9 is opened, stopping the pencil 22.

Similarly, to draw a logarithmic spiral, the switch S-5 is adjusted to proper position to increase or decrease the radius depending upon the type of logarithmic spiral desired. Then the switch S-7 is closed and S-8 is also closed, if it has not already been closed. The operator adjusts the switch 104 to load the read-in of the Logarithmic Spiral Section to the desired increment or decrement over the spiral as read on the indicator lamps of the Display Section. When this read-in has been reached, the switch 104 is returned to neutral position. Switch S-3 is then changed in position to load the Logarithmic Spiral Section storage from the Logarithmic Spiral Section read-in. Thereupon, switch S-9 is closed and the motors 26 and 28 controlled to move the pencil 22 in a logarithmic spiral of the desired configuration. Switch S-9 is opened when a curve of the desired length has been drawn.

The foregoing describes the basic operation of the machine. Most drawings will be found to be composed of combinations of various operations heretofore described.

| Read-In Section | | |
|---|---|---|
| Inverter circuits | | #7404 |
| NORD gates | | #7400 |
| Pulse generator | | #555 |
| Logarithmic Spiral Section | | |
| Read-in | 3 | #74192 |
| Read-outs | 3 | #7408 |
| Storage | 3 | #74192 |
| Countdown | 3 | #74192 |
| Reload Control | 3 | #7432 |
| Countdown Control | 3 | #7432 plus 1 Inverter cir. 7404 |
| Pulse generator | | #555 |
| NAND gates | | #7400 |
| Inverter circuit | | #7404 |
| Flip-flop | | #74123 |
| Power Control | | |
| Counters | 4 | #74193 |
| Counters | 4 | #74193 |
| NOR gates | | #7430 |
| Flip-flop | | #74107 |
| #118 gate | | C 74 SL10T |
| NAND gates | | #7400 |
| Indicator Section | | |
| Data distributors | | #74154 |
| Up-down counter | | #74193 |
| Inverter circuits | | #7404 |
| Pulse generator | | #555 |
| -continued | | |
| Decoder | 2 | #7448 |

COMPONENT VALUES

The Circuitry herein described and illustrated is subject to considerable variation. Suitable components, using Texas Instruments Co. symbols include the following:

| Circle Section: | | |
|---|---|---|
| Read-in | 6 | #74192 up-down counters |
| Storage | Same | |
| Load & Countdown | Same | |
| Read-Outs | 6 | #7408 |
| Countdown Control | 6 | #7432 OR gates plus 1 #7404 hex circuit |
| Inverter circuits | | #7404 |
| NAND gates | | #7400 |
| AND gates | | #7400 |
| Flip-flop | | #74123 |
| Spiral Section: | | |
| Read-in | 4 | #74192 |
| Storage | Same | |
| Load & Countdown | Same | |
| Read-outs | 4 | #7408 |
| Countdown Controls | 4 | #7432 OR gates plus 1 #7407 hex circuit |
| NAND gates | | #7400 |
| Inverter circuits | | #7404 |
| Circle Control: | | |
| Counter | 2 | #74193 |
| OR circuits | | #7432 |
| Inverter circuit | | #7404 |

What is clamed is:

1. A drafting machine comprising a board on X-axis track mounted on said board, a Y-axis mount reciprocable along said X-axis track, a Y-axis track fixed to said Y-axis mount, a carrier reciprocable along said Y-axis track, a pencil on said carrier adapted to mark a paper on said board, a first variable speed motor, a second fixed speed motor having a maximum speed less than the maximum speed of said first motor, a third variable speed motor having the range of speeds equal to that of said first motor, first drive means responsive in speed and direction to the difference in speed between said first and second motors, second drive means responsive in speed and direction to the difference in speed between said second and third motors, electrical means for driving said first and third motors at individual variable speeds and said second motor continuously, third drive means for moving said Y-axis mount along said X-axis track responsive to relative movement of said first and second drive means and fourth drive means for moving said carrier along said Y-axis track responsive to said relative movement of said first and second drive means.

2. A machine according to claim 1 in which said first and second drive means have first and second drive pulleys, said X-axis track has fixed third and fourth pulleys at one end and fixed fifth and sixth pulleys at the opposite end, said Y-axis mount has seven and eight pulleys for said third drive means comprises a belt passing around said first, said third, said seventh, said fourth, said second, said fifth, said sixth and back to said first pulley.

3. A machine according to claim 2 in which said Y-axis track has ninth and tenth pulleys at poopsite ends, said ninth pulley being fixed for rotation which said seventh pulley and said fourth drive means comprises a belt passing around said ninth and tenth pulleys and fixed to said carrier.

4. A machine according to claim 1 which further comprises a casing, a first shaft fixed to said first drive means rotatably mounted in and extending from said casing, a hollow second shaft over a portion of said first shaft extending from said casing and fixed to said second drive means, a first bevel gear system comprising a first bevel gear rotated by said first motor, a second bevel gear meshing with first bevel gear fixed to turn said first shaft, and a third bevel gear meshing with said second bevel gear fixed to said second shaft, a second bevel gear system comprising a fourth bevel gear rotated by said second motor, a fifth bevel gear meshing with said fourth gear and fixed to turn said second shaft and a sixth bevel gear meshing with said fifth gear rotated by said first motor.

5. A machine according to claim 1 which further comprises mounting means on said carrier whereby said pencil may reciprocate relative to said board and a solenoid operable to left said pencil from said board.

6. A machine according to claim 1 which further comprises indicator means having a pointer, said pointer being controlled responsive to the relative speeds of said first and third motors.

7. A drafting machine according to claim 1 in which said electrical means comprises a motor control for said first and third motors, said motor control for said first motor being responsive to a power control, said power control comprising a first plurality of resistors each controlled by a first transistor whose base is connected to one of a plurality of first power control up-down counters, a pulse generator and a manual control for transmitting a selected number of pulses from said pulse generator to said first power control up-down counters, said motor control for said third motor being responsive to said power control, said power control further comprising a second plurality of resistors each controlled by a second transistor whose base is connected to one of a plurality of second power control up-down counters, said first plurality of resistors being connected to a source of power and to said motor control for said first motor, said second plurality of resistors being connected to said source of power and to said motor control for said third motor.

8. A machine according to claim 1 in which said electrical means comprises a counting means having a plurality of up-down counters each having a plurality of counts, a plurality of resistors, means for connecting said resistors to a source of power responsive to the counts of said up-down counters, said resistors being interposed between said source and one of said motors, a pulse generator and a source of high voltage and a source of low voltage and switching means, said switching means selectively connecting and disconnecting said pulse generator and said counting means and selectively connecting either said source of high voltage or said source of low voltage to said counting means to cause said up-down counters to count up or down, said counting means being separated into two sets of up-down counters, transistors and resistors, one said set for said first motor and the other said set for said second motor.

9. A machine according to claim 8 which further comprises second switching means between said resistors and said motors to disconnect said motors and stop movement of said pencil.

10. A machine according to claim 8 which further comprises a coil actuated indicator connected to said resistors and responsive to current passing to said motors, said indicator showing the direction of movement of said pencil.

11. A machine according to claim 8 which further comprises a circle read-in comprising a plurality of up-down circle read-in counters, a circle storage comprising a plurality of up-down circle storage counters, second switching means for transferring the circle read-in count to circle storage count, a circle countdown comprising a plurality of up-down circle countdown counters, third switching means for transferring at least a part of said circle storage countout through said circle countdown, a circle control comprising a plurality of circle control up-down counters, a second pulse generator connected into said circle control up-down counters, electrical means interconnecting said last mentioned counters into said power control up-down counters to increment said power control up-down counters and fourth switching means selectively connecting and disconnecting said first-mentioned pulse generator and said circle read-in counters and selectively connecting either said source of high voltage or said source of low voltage to said circle read-in counters.

12. A machine according to claim 11 which further comprises display means visually displaying the count in said circle read-in counters and in said circle storage counters.

13. A machine according to claim 11 which further comprises a spiral read-in comprising a plurality of up-down spiral read-in counters, a spiral storage comprising a plurality of up-down spiral storage counters, fifth switching means for transferring spiral read-in count to spiral storage count, a spiral countdown comprising a plurality of up-down spiral countdown counters, sixth switching means for transferring at least a part of said spiral storage countout through said spiral countdown, means for connecting said second pulse generator into said spiral countdown counters, electrical means interconnecting said spiral countdown counters into said circle countdown counters to increment said circle countdown counters, and seventh switching means selectively connecting and disconnecting said first-mentioned pulse generator and said spiral read-in counters and selectively connecting either said source of high voltage or said source of low voltage to said spiral read-in counters.

14. A machine according to claim 13 which further comprises display means visually displaying the count in said spiral read-in counters and in said spiral storage counters.

15. A machine according to claim 13 which further comprises a logarithmic spiral read-in comprising a plurality of up-down logarithmic spiral read-in counters, a logarithmic spiral storage comprising a plurality of up-down logarithmic storage counters, eighth switching means for transferring logarithmic spiral read-in count to logarithmic spiral count, a logarithmic spiral countdown comprising a plurality of up-down spiral countdown counters, ninth switching means for transferring at least a part of said logarithmic storage countout through said spiral countdown, means for connecting said second pulse generator into said logarithmic spiral countdown, means for connecting said second pulse generator into said logarithmic spiral countdown counters, electrical means interconnecting said logarithmic spiral countdown counters into said spiral countdown counters to increment said spiral countdown counters, and tenth switching means selectively connecting and disconnecting said first-mentioned pulse generator and said logarithmic spiral read-in counters and selectively connecting either said source of high voltage or said source of low voltage to said logarithmic read-in counters.

* * * * *